United States Patent
Lu et al.

(10) Patent No.: US 12,406,329 B2
(45) Date of Patent: Sep. 2, 2025

(54) SIMULATION TESTING SYSTEM AND SIMULATION TESTING METHOD FOR IMAGE PROCESSING ALGORITHM

(71) Applicant: ML TECHNOLOGY LTD., New Taipei (TW)

(72) Inventors: Chi-Heng Lu, New Taipei (TW); Chia-Liang Hsu, New Taipei (TW); Ching-Hung Liang, New Taipei (TW); Chang-Yu Wang, New Taipei (TW); Ming-Chen Hsu, New Taipei (TW)

(73) Assignee: ML TECHNOLOGY LTD., New Taipei (TW)

( * ) Notice: Subject to any disclaimer, the term of this patent is extended or adjusted under 35 U.S.C. 154(b) by 483 days.

(21) Appl. No.: 17/536,007

(22) Filed: Nov. 27, 2021

(65) Prior Publication Data
US 2022/0254051 A1   Aug. 11, 2022

Related U.S. Application Data

(60) Provisional application No. 63/147,211, filed on Feb. 8, 2021.

(51) Int. Cl.
*G06T 5/20* (2006.01)
*G06T 3/4092* (2024.01)
(Continued)

(52) U.S. Cl.
CPC .............. *G06T 3/4092* (2013.01); *G06T 5/20* (2013.01); *G06T 5/50* (2013.01); *G06T 5/92* (2024.01);
(Continued)

(58) Field of Classification Search
None
See application file for complete search history.

(56) References Cited

U.S. PATENT DOCUMENTS 10,833,722 B1   11/2020  Jennings et al.
2005/0120055 A1*  6/2005  Kawaguchi ............. G06F 16/51
                                                         707/E17.031
(Continued)

FOREIGN PATENT DOCUMENTS

CN        102457655 B      9/2014
CN        104787085 A  *   7/2015   ............... B61K 9/08
(Continued)

OTHER PUBLICATIONS

Reddy, G. Bharadwaja, and K. Anusudha. "Implementation of image edge detection on FPGA using XSG." 2016 International Conference on Circuit, Power and Computing Technologies (ICCPCT). IEEE, 2016. (Year: 2016).*
(Continued)

*Primary Examiner* — Incent Rudolph
*Assistant Examiner* — Meredith Taylor
(74) *Attorney, Agent, or Firm* — Chun-Ming Shih; HDLS IPR SERVICES

(57) ABSTRACT

A testing system for an image processing algorithm including a control unit, an image processing device, an image processing hardware, and a testing device is disclosed. The control unit provides an original image and parameters. The image processing device obtains the original image and the parameters, and drives the image processing hardware to perform a first image processing procedure to the original image based on the parameters to generate a hardware-processed image. The testing device obtains the original image, the parameters, and the hardware-processed image, and performs, through a simulation software, a second image processing procedure to the original image based on the parameters to generate a software-processed image. The testing device compares the hardware-processed image with the software-processed image through a testing software to
(Continued)

generate a comparing result that shows a pixel difference of the hardware-processed image and the software-processed image.

19 Claims, 12 Drawing Sheets

(51) Int. Cl.
| | |
|---|---|
| *G06T 5/50* | (2006.01) |
| *G06T 5/92* | (2024.01) |
| *G06T 5/94* | (2024.01) |
| *G06T 7/00* | (2017.01) |
| *G06V 10/75* | (2022.01) |

(52) U.S. Cl.
CPC .............. *G06T 5/94* (2024.01); *G06T 7/0002* (2013.01); *G06V 10/751* (2022.01)

(56) References Cited

U.S. PATENT DOCUMENTS

2013/0058524 A1* 3/2013 Cohen .................. G06V 20/693
382/103
2019/0236414 A1* 8/2019 Totolos, Jr. ................ G06T 1/20
2019/0243953 A1* 8/2019 Fargo ..................... G06F 21/602
2021/0119632 A1* 4/2021 Zhu ................ G01R 31/318519

FOREIGN PATENT DOCUMENTS

CN 112100954 A 12/2020
WO WO-2020048275 A1 * 3/2020 ......... G06K 9/00288

OTHER PUBLICATIONS

Office Action dated Feb. 6, 2023 of the corresponding Taiwan patent application No. 110133460.
Yuepan Shao, "Research on Computer Software Technology and Development Design", Dec. 31, 2018, Beijing University of Technology, pp. 139-140.
Office Action dated Jan. 4, 2025 of the corresponding China patent application No. 202111200395.6.
G. Bharadwaja Reddy et al. "Implementation of Image Edge Detection on FPGA using XSG", 2016 International Conference on Circuit, Power and Computing Technologies [ICCPCT], Mar. 18-19, 2016, Nagercoil, India, pp. 1533-1537.

* cited by examiner

SIMULATION TESTING SYSTEM AND SIMULATION TESTING METHOD FOR IMAGE PROCESSING ALGORITHM

CROSS-REFERENCE TO RELATED APPLICATION

This patent application claims the benefit of U.S. Provisional Patent Application No. 62/147,211, filed Feb. 8, 2021, which is incorporated by reference herein.

BACKGROUND OF THE DISCLOSURE

Technical Field

The present disclosure relates to a testing system and a testing method, and specifically relates to a system and a method of testing the algorithm being executed and the parameters being used.

Description of Related Art

During the development of each integrated circuit (IC), the developers generally design an algorithm(s) for the demanded function(s) in advance, and then simulate the algorithm on a computer through a specific software (such as a software written by C or MATLAB, etc.), so as to obtain the execution effect of the algorithm. If the execution effect of the algorithm is determined to be satisfied after the simulation, the developers hand the algorithm to IC designers, so the IC designers may implement the same algorithm on a specific hardware.

However, the IC designers may face some design troubles when designing the algorithm that will run on the hardware. For example, due to hardware limitations (such as the accuracy) or design considerations (such as the memory capacity of the hardware), an algorithm may not reach the same effect as being executed by the software simulation when being implemented on the hardware. Taking an image processing algorithm for an example, after respectively performing an image process on same image through same algorithm, the hardware and the software are likely to obtain two images that have a pixel difference.

Generally, the implementing result of the hardware should be consistent with the simulation result of the software, thus may ensure the accuracy of IC design. Taking the image processing field as an example, most of the related arts make the hardware and the software to respectively perform an image process to same image through the same algorithm for outputting two processed images, and then compare whether the two processed images are consistent.

The aforementioned comparison is generally performed during a design simulation procedure in an early edge of IC design. In particular, the designers usually choose a standard image, execute an original software to process the standard image and also control the hardware to process the standard image, and then compare the two processed results with each other. In other words, the designers do not process and compare a huge number of images physically after the IC is commercialized. Therefore, the errors caused during the IC design procedure may not be accurate noticed, so the processed result of the commercialized hardware device may not reach a demanded effect.

Besides, one product (such as an image process IC) is usually embedded with multiple algorithms; however, only the final-outputted image can be compared if the user compares the image manually. When a difference between an image processed and outputted by the hardware and another image processed and outputted by the software is found after the comparison, the user can barely determine which of the multiple algorithms is abnormal. As a result, it is very difficult for the user to debug.

In order to solve the above problems, the present disclosure provides a testing system and a testing method, which may automatically compare an image outputted by the hardware with another image outputted by the software, so as to test whether the applied algorithms are abnormal or not.

SUMMARY OF THE DISCLOSURE

The present disclosure is directed to a testing system and a testing method for an image processing algorithm, which may automatically provide same image and same algorithm both to hardware and to software, for the hardware and the software to respectively perform same image process to the same image and compare a difference between the two processed images automatically, so as to determine whether the currently applied image parameter is adequate to the hardware or not.

In one of the exemplary embodiments, the testing system of the present disclosure includes a control unit, an image processing device connected with the control unit, an image processing hardware connected with the image processing device, and a testing device connected with the control unit and the image processing hardware. The control unit provides an original image and a parameter setting value. The image processing device obtains the original image and the parameter setting value, and drives the image processing hardware to perform a first image processing procedure to the original image in accordance with the parameter setting value and to generate a hardware-processed image. The testing device obtains the hardware-processed image from the image processing hardware and obtains the original image and the parameter setting value from the control unit or the image processing hardware.

wherein, the testing device executes a simulation software and a testing software, the simulation software is executed to perform a second image processing procedure to the original image in accordance with the parameter setting value and generate a software-processed image, and the testing software is executed to perform a comparing procedure to compare the hardware-processed image with the software-processed image and generate a comparing result, wherein the comparing result shows a pixel difference between the hardware-processed image and the software-processed image.

In one of the exemplary embodiments, the testing method of the present disclosure is incorporated with a testing system having an image processing device for controlling a first image processing procedure and a testing device for controlling a second image processing procedure, and the testing method includes the following steps:

a) obtaining an original image and a parameter setting value;

b) driving an image processing hardware by the image processing device for the image processing hardware to perform the first image processing procedure to the original image in accordance with the parameter setting value and to generate a hardware-processed image;

c) obtaining the hardware-processed image from the image processing hardware by the testing device;

d) executing a simulation software by the testing device, wherein the simulation software is executed to perform the second image processing procedure to the original image in accordance with the parameter setting value and to generate a software-processed image; and e) executing a testing software by the testing device, wherein the testing software is executed to perform a comparing procedure to compare the hardware-processed image with the software-processed image to generate a comparing result, wherein the comparing result shows a pixel difference between the hardware-processed image and the software-processed image.

In comparison with related art, the present disclosure may automatically provide the image to be processed and the parameters to be applied by the algorithm through the system, so as to ensure the consistence of the image and the parameters respectively used by hardware algorithm and software algorithm. Besides, the system may automatically compare the pixel difference between a hardware-processed image and a software-processed image, and determine whether an error exists in the applied algorithm(s) or parameters. Therefore, the result of the processed images respectively generated by the hardware device and the software device may be ensured to be consistent, so as to maintain the stability of the output of the devices.

DETAILED DESCRIPTION OF THE DISCLOSURE

In cooperation with the attached drawings, the technical contents and detailed description of the present disclosure are described hereinafter according to multiple embodiments, being not used to limit its executing scope. Any equivalent variation and modification made according to appended claims is all covered by the claims claimed by the present disclosure.

Figure 1:
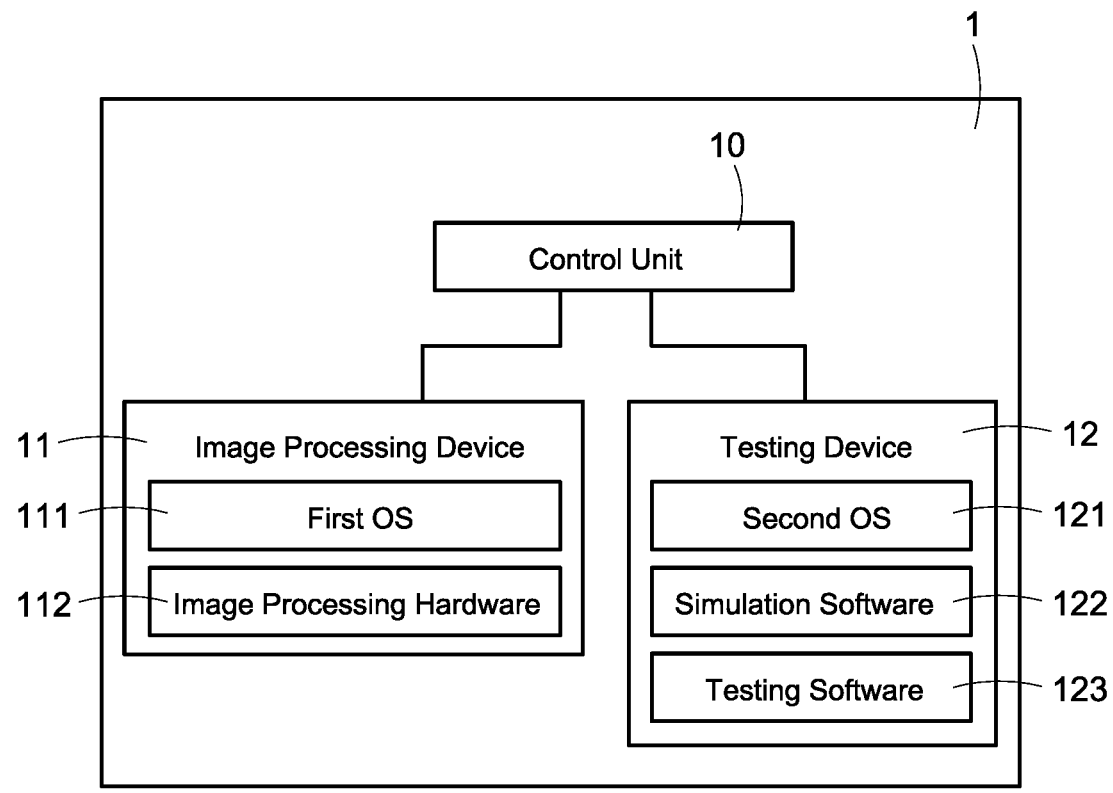
FIG. 1 is a block diagram of a testing system of a first embodiment according to the present disclosure.

Please refer to FIG. 1, which is a block diagram of a testing system of a first embodiment according to the present disclosure. As disclosed in FIG. 1, the present disclosure discloses a testing system for an image processing algorithm (referred to as the testing system 1 hereinafter), the testing system 1 includes a control unit 10, an image processing device 11, and a testing device 12. The image processing device 11 is used to drive a specific hardware to perform an image process to a target image in order to generate a hardware-processed image; the testing device 12 is used to execute a specific software to perform the same image process to the same target image in order to generate a software-processed image. One technical effect of the present disclosure is that the testing system 1 may automatically provide the target image to be processed and a parameter(s) to be applied by an image processing algorithm(s), and automatically compare the difference between the hardware-processed image and the software-processed image.

The image processing device 11 may be configured to run a first operating system (OS) 111, and connected with an image processing hardware 112. Through the first OS 111, the image processing device 11 may drive the image processing hardware 112 to perform the image processing algorithm to the target image to generate the hardware-processed image. The testing device 11 may be configured to run a second OS 121, and to execute a simulation software 122 under the operation of the second OS 121. Through the simulation software 122, the testing device 12 may perform the same image processing algorithm to the same target image through a software simulation, so as to generate the software-processed image. Also, by executing a testing software 123, the testing device 12 may further compare the hardware-processed image with the software-processed image.

In one of the exemplary embodiments, the first OS 111 ran by the image processing device 11 is different from the second OS 121 ran by the testing device 12. For example, the first OS 111 may be Linux, which is easier for setting and controlling the image processing hardware 112; the second OS 121 may be Windows, which is easier for executing the simulation software 122 and the testing software 123. However, the above description is only one embodiment of the present disclosure, but not limited thereto.

In one of the exemplary embodiments, the testing system 1 may be a computer, a server, or an electronic device with a specific specification. In this embodiment, the control unit 10 may be a processor, a central process unit (CPU), a micro control unit (MCU), or a system on chip (SoC), etc. The image processing device 11 and the testing device 12 may be hardware components physically connected with the control unit 10, or be software modules implemented when the control unit 10 executes specific computer readable program codes, but not limited thereto.

In another embodiment, the control unit 10 may be a computer, a server, or an electronic device with a specific specification, and connect with the image processing device 11 and the testing device 12. In this embodiment, the image processing device 11 and the testing device 12 may be hardware devices (such as computers, servers, or other electronic devices), set in same or different locations with the control unit 10 and connect with the control unit 10 through either a wired manner or a wireless manner.

In another embodiment, the image processing device 11 and the testing device 12 may be hardware devices (such as computers, servers, or other electronic devices), and the control unit 10 may be implemented by a processor either in the image processing device 11 or in the testing device 12.

However, the above descriptions are only few embodiments of the present disclosure, but not limited thereto.

Figure 2:
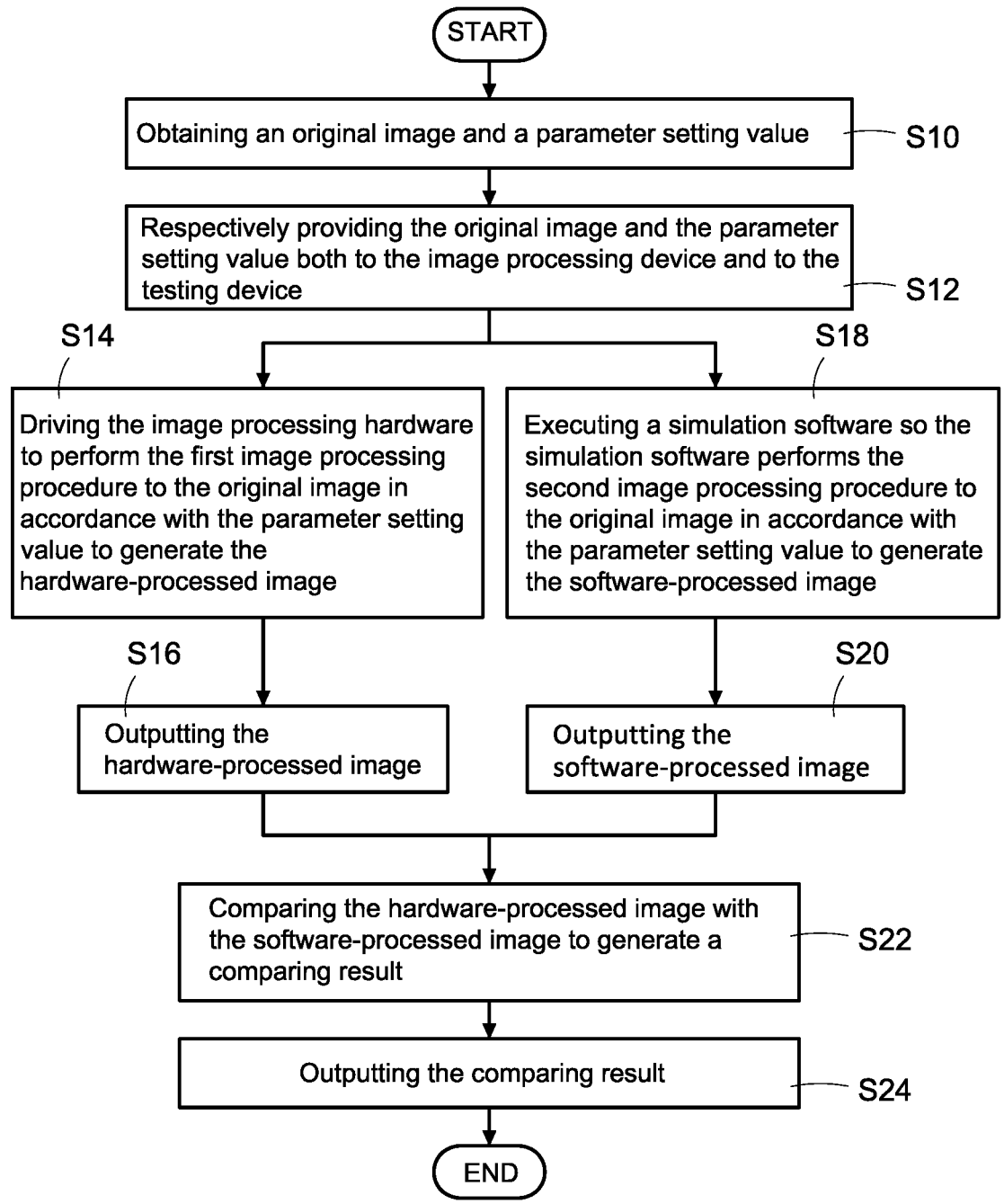
FIG. 2 is a flowchart of a testing method of a first embodiment according to the present disclosure.

Please refer to FIG. 2 at the same time, which is a flowchart of a testing method of a first embodiment according to the present disclosure. FIG. 2 discloses a testing method for an image processing algorithm of the present disclosure (referred to as the testing method hereinafter). The testing method may be incorporated with the testing system 1 as shown in FIG. 1, but not limited to be incorporated with the testing system 1. For the ease of understanding, the following descriptions are provided on the basis of the testing system 1 and the testing method disclosed in FIG. 1 and FIG. 2, but not limited thereto.

As shown in FIG. 2, the testing system 1 of the present disclosure obtains an original image needed to be performed with an image process, and obtains a parameter setting value to be applied by an image processing algorithm to be performed (step S10). Next, the control unit 10 respectively provides the original image and the parameter setting value both to the image processing device 11 and to the testing device 12 (step S12).

In the embodiment, the image processing device 11 is used to control a first image processing procedure, the testing device 12 is used to control a second image processing procedure. In particular, the first image processing procedure indicates a procedure that executing a designated algorithm through a designated hardware to implement the image process to the original image; the second image processing procedure indicates another procedure that simulating the same algorithm through a designated software to implement the image process to the same original image. In other words, the first image processing procedure and the second image processing procedure respectively execute the same algorithm to perform the image process to the same image, the difference therebetween is that the first image processing procedure is performed by hardware but the second image processing procedure is performed by software.

After the step S12, the image processing device 11 obtains the original image and the parameter setting value, and drives the connected image processing hardware 112, so the image processing hardware 112 performs the first image processing procedure to the original image in accordance with the parameter setting value to generate the hardware-processed image (step S14). After the step S14, the image processing hardware 112 outputs the hardware-processed image (step S16).

The image processing hardware 112 may be, for example but not limited, a field programmable gate array (FPGA), an application specific integrated circuit (ASIC), or a graphics processing unit (GPU). In the step S12, the image processing device 11 automatically or manually actives an engineering mode of the first OS 111 through a processor, such as to active the command window under Linux. By reading the parameter setting value and inputting an execution command under the engineering mode, the image processing device 11 may drive the image processing hardware 112 to perform the first image processing procedure.

The parameter setting value may be stored in a Jason file. The control unit 10 may store this Jason file in a designated folder under the first OS 111, so the image processing hardware 112 is capable of reading the parameter setting value stored in the designated folder. The content of the parameter setting value is relevant to an algorithm to be executed in the first image processing procedure.

In one of the exemplary embodiments, the first image processing procedure may be at least one of an image preprocessing procedure, a de-bayering procedure, a gamma correction procedure, a color correction procedure, an edge enhancement procedure, a scaling procedure, a dithering procedure, and an image post-processing procedure, but not limited thereto.

If the first image processing procedure is the scaling procedure, the parameter setting value may be a scaling magnification rate ratio. If the first image processing procedure is the image preprocessing procedure, the parameter setting value may be a filter mask. If the first image processing procedure is the gamma correction procedure, the parameter setting value may be a calibration table. Besides, if the algorithm executed in the first image processing procedure needs to use a look-up table, the parameter setting value may include the look-up table needed by the algorithm.

However, the above descriptions are only few embodiments of the present disclosure, but not limited thereto.

After the step S12, the testing device 12 obtains the original image and the parameter setting value, and executes a specific software, so the software being executed may perform the second image processing procedure to the original image in accordance with the parameter setting value to generate the software-processed image (step S18). After the step S18, the testing device 12 may output the software-processed image (step S20).

In one of the exemplary embodiments, the testing device 12 executes the simulation software 122 in the step S18, so the simulation software 122 performs the second image processing procedure to the original image in accordance with the parameter setting value to generate the software-processed image.

As mentioned above, the algorithm executed by the simulation software 122 in the second image processing procedure is identical to the algorithm executed by the image processing hardware 112 in the first image processing procedure. In other words, the second image processing procedure may also be one of the image preprocessing procedures, the de-bayering procedure, the gamma correction procedure, the color correction procedure, the edge enhancement procedure, the scaling procedure, the dithering procedure, and the image post-processing procedure.

In one of the exemplary embodiments, the algorithm may be directly recorded in the image processing hardware 112 and the simulation software 122; therefore, the image processing hardware 112 and the simulation software 122 do not have to obtain the algorithm through additional approaches.

In one of the exemplary embodiments, the step S16 is for the image processing hardware 112 to transmit the hardware-processed image to the testing device 12 through the image processing device 11, and the step S20 is for the simulation software 122 to directly transmit the software-processed image to the testing device 12.

After the step S20, the testing device 12 may execute the testing software 123, and use the test software 123 to perform a comparing procedure in order to compare the hardware-processed image with the software-processed image, and generate a comparing result correspondingly (step S22). The testing device 12 then outputs the comparing result (step S24), so the user may instantly be awarded of the difference between the hardware-processed image and the software-processed image.

In one of the exemplary embodiments, the comparing result generated by the testing software 123 may indicate a pixel difference between the hardware-processed image and the software-processed image. In particular, the comparing result may record the differences with respect to RGB (i.e., red, green, and blue) of each pixel point (or a part of the pixel points) in the hardware-processed image and in the software-processed image.

In the above embodiment, the testing device 12 obtains the original image and the parameter setting value from the control unit 10, and obtain the hardware-processed image from the image processing hardware 112. In other embodiment, the testing device 12 may directly obtain the original image, the parameter setting value, and the hardware-processed image from the image processing hardware 112 (detailed described in the following).

It should be mentioned that the original image may be a picture file (such as a picture file with .jpg extension or .bmp extension) or a transformed text file (such as a text file with .txt extension or .hex extension), but not limited to.

Figure 3:
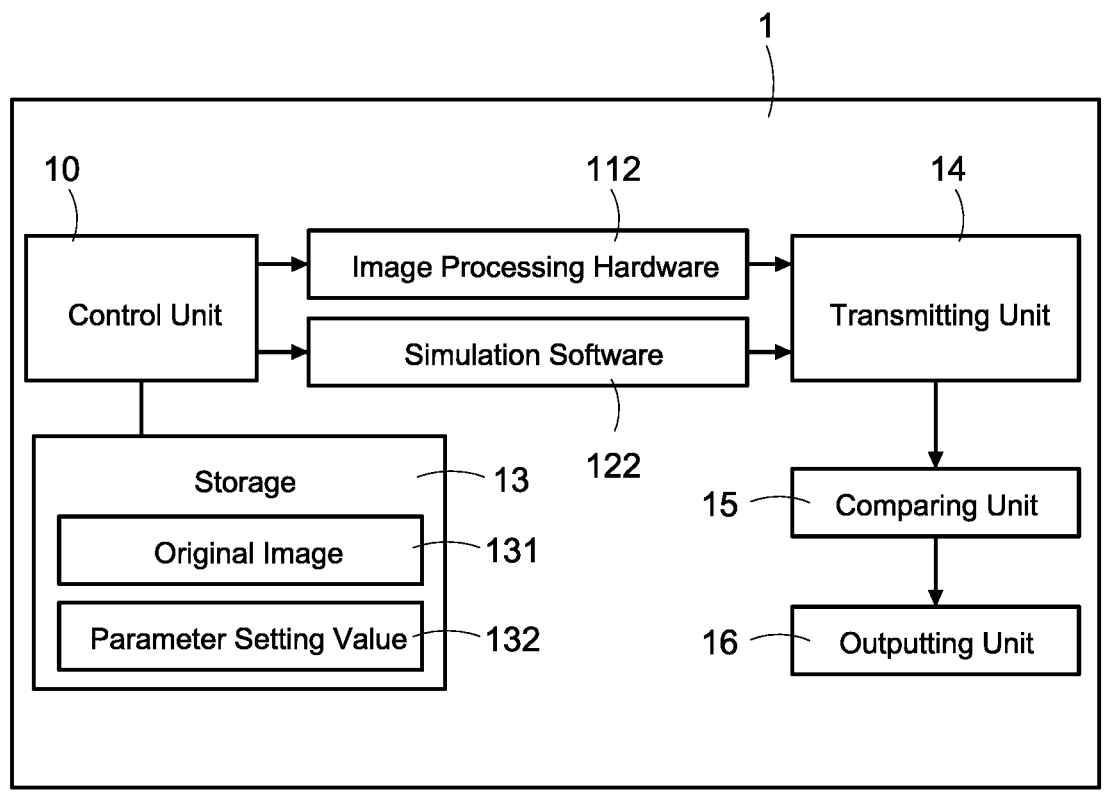
FIG. 3 is a block diagram of the testing system of a second embodiment according to the present disclosure.

Please refer to FIG. 1 through FIG. 3, wherein FIG. 3 is a block diagram of the testing system of a second embodiment according to the present disclosure. For the ease of understanding, the testing system 1 in the embodiment of FIG. 3 is depicted by one single computer, server, or electronic device with a specific specification.

As shown in FIG. 3, the testing system 1 may include the control unit 10, the image processing hardware 112, the simulation software 122, and the storage 13 as mentioned above. The storage 13 may be, for example, a memory, a hard-disk drive (HDD), or other types of storing medium. Therefore, the storage 13 may be used to store an original image 131 to be processed, and a parameter setting value 132 to be applied by one or more image processing algorithms.

In the embodiment, the testing system 1 drives the image processing hardware 112 through the control unit 10 or other processor (not shown), and executes the simulation software 122 through the control unit 10 or other processor. Also, the control unit 10 may respectively provide the original image 131 and the parameter setting value 132 stored in the storage 13 both to the image processing hardware 112 and to the simulation software 122.

The image processing hardware 112 performs the first image processing procedure to the original image 131 in accordance with the parameter setting value 132 to generate the hardware-processed image, and outputs the hardware-generated image to a transmitting unit 14. The simulation software 122 performs the second image processing procedure to the original image 131 in accordance with the parameter setting value 132 to generate the software-processed image, and outputs the software-processed image to the transmitting unit 14. Therefore, the transmitting unit 14 transmits the hardware-processed image and the software-processed image to a comparing unit 15 for the comparing unit 15 to compare these two images.

In one of the exemplary embodiments, the transmitting unit 14 and the comparing unit 15 are software units generated when the control unit 10 or a processor of the testing system 1 executes certain program codes (such as the aforementioned testing software 123), wherein, the transmitting unit 14 regards the hardware-processed image and the software-processed image as input parameters and import the imports parameters into the testing software 123.

In another embodiment, the comparing unit 15 may be configured in a cloud server (not shown). In this embodiment, the transmitting unit 14 may be a physical transmitting unit of the testing system 1, such as a Wi-Fi transmitting unit, a Bluetooth transmitting unit, a near field communication (NFC) unit, or a Zigbee transmitting unit, etc. The transmitting unit 14 transmits the hardware-processed image and the software-processed image to the comparing unit 15, and receives the comparing result transmitted from the comparing unit 15.

In the embodiment of FIG. 3, the testing system 1 may include an outputting unit 16, such as a displayer. The testing system 1 may optionally display the original image 131, the parameter setting value 132, the hardware-processed image, the software-processed image, and the comparing result through the outputting unit 16, so the user may easily realize the current status of the algorithm(s).

In the above embodiment, the testing system 1 is depicted as one single computer, server, or electronic device; however, the testing system 1 of the present disclosure may be implemented by two or more than two separated physical devices.

Figure 4:
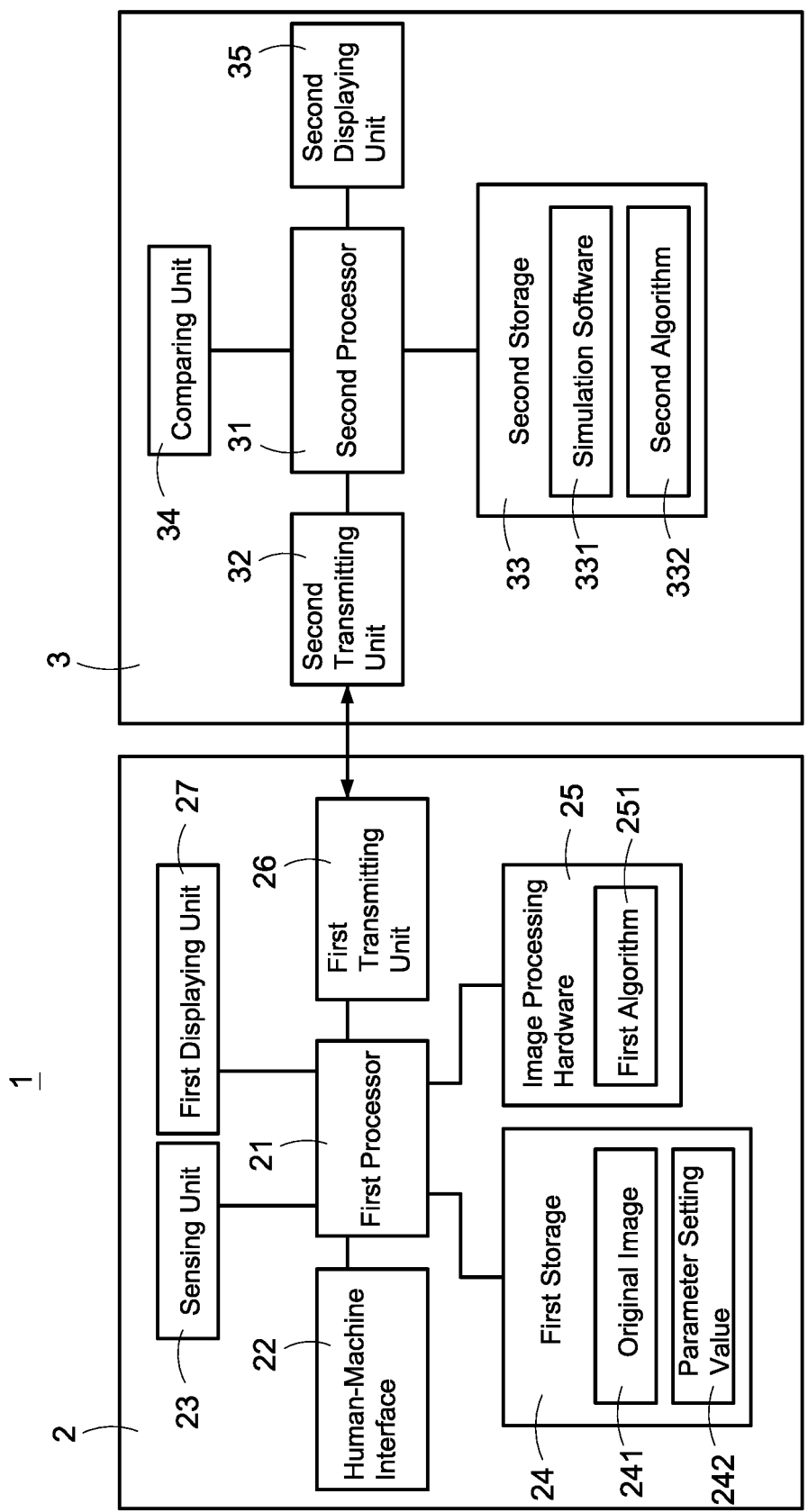
FIG. 4 is a block diagram of the testing system of a third embodiment according to the present disclosure.
Figure 5:
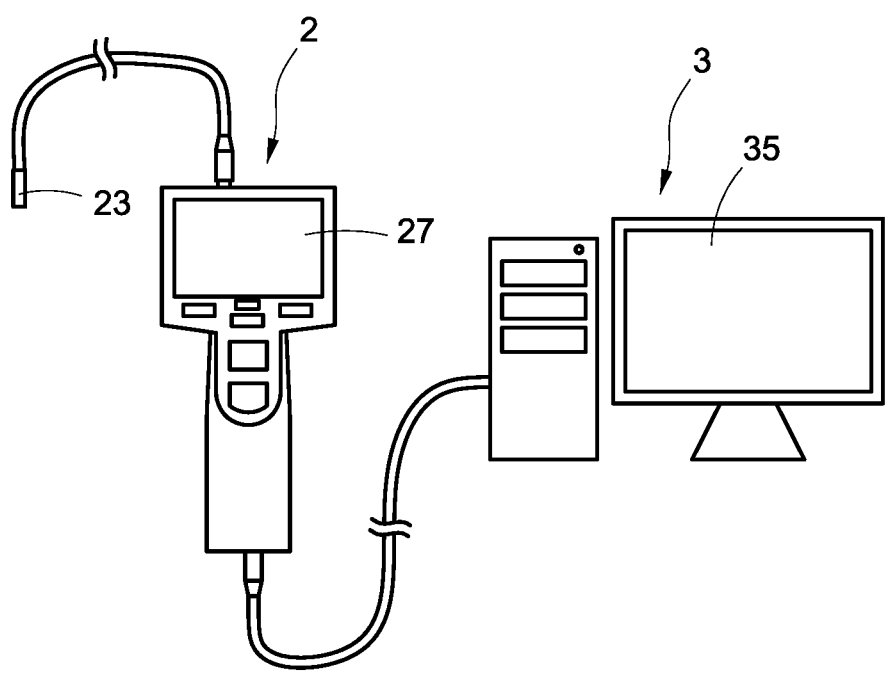
FIG. 5 is a schematic diagram of a testing system of a first embodiment according to the present disclosure.

Please refer to FIG. 3, FIG. 4, and FIG. 5, wherein FIG. 4 is a block diagram of the testing system of a third embodiment according to the present disclosure, and FIG. 5 is a schematic diagram of a testing system of a first embodiment according to the present disclosure.

FIG. 4 and FIG. 5 disclose an image processing device 2 and a testing device 3 which are separately configured. As shown in FIG. 4, the image processing device 2 includes a first processor 21, the testing device 3 includes a second processor 31. When the image processing device 2 connects with the testing device 3, the aforementioned control unit 10 may be implemented by the first processor 21 or the second processor 31, and the image processing device 2, the testing device 3, and the control unit 10 may be incorporated with each other to implement the testing system 1 and the testing method of the present disclosure.

In the embodiment as shown in FIG. 5, the image processing device 2 is depicted as a medical endoscope, which is used to detect external images in real-time. In the embodiment, the testing system 1 regards the external image detected by the image processing device 2 as the aforementioned original image. Further, the image processing device 2 and the testing device 3 respectively perform an image process to the original image.

In one of the exemplary embodiments, the testing device 3 is a computer, a server, or an electronic device with a specific specification. The testing device 3 and the image processing device 2 are configured at same place. In this embodiment, the image processing device 2 may establish a connection with the testing device 3 through a wired manner (such as through a USB transmitting line) or a wireless manner (such as through Wi-Fi, Bluetooth, or NFC, etc.).

In another embodiment, the testing device 3 is a cloud server. In this embodiment, the image processing device 2 may establish a wireless connection with the testing device 3 through the Internet.

As shown in FIG. 4, the image processing device 2 may include the first processor 21, a human-machine interface 22, a sensing unit 23, a first storage 24, an image processing hardware 25, a first transmitting unit 26, and a first displaying unit 27, wherein the human-machine interface 22, the sensing unit 23, the first storage 24, the image processing hardware 25, the first transmitting unit 26, and the first displaying unit 27 are electrically connected with the first processor 21.

In one of the exemplary embodiments, the image processing device 2 accepts an external operation through the human-machine interface 22 (such as a button, a touch screen, or a signal input port, etc.), so as to import the original image 241 to the image processing device 2 and to set the parameter setting value 242 needed by the image processing algorithm. The original image 241 and the parameter setting value 242 may be stored in the first storage 24.

In one of the exemplary embodiments, the user may operate the image processing device 2 through the human-machine interface 22; therefore, the user may import the original image 241 and set the parameter setting value 242 to the image processing device 2 through duplicating, downloading, or transmitting.

In another embodiment, the image processing device 2 senses an external environment through the sensing unit 23, so as to directly generate the original image 241. In the embodiment, the sensing unit 23 may be, for example but not limited to, a camera, an infrared sensor, a laser sensor, or an ultrasonic sensor, etc. Moreover, the sensing unit 23 may be a signal input port of different protocols, such as high-definition multimedia interface (HDMI), video graphics array (VGA), digital visual interface (DVI), or display port (DP), etc. However, the above descriptions are only few embodiments of the present disclosure, but not limited thereto.

The image processing hardware 25 records a first algorithm 251 needed for performing the first image processing procedure. After the image processing device 2 obtains the original image 241 and the parameter setting value 242, the control unit 10 (such as the first processor 21 or the second processor 31) drives the image processing hardware 2 to execute the first algorithm 251 in accordance with the parameter setting value 242, so as to perform a first image processing procedure to the original image 241 in order to generate the hardware-processed image. Also, the image processing device 2 may transmit the original image 241, the parameter setting value 242, and the hardware-processed image to the testing device 3 through the first transmitting unit 26.

It should be mentioned that if the image processing device 2 includes the first displaying unit 27 (such as a touch screen or a liquid crystal display (LCD)), the first processor 21 may display the original image 241, the parameter setting value 242, or the hardware-processed image on the first displaying unit 27 to be confirmed by the user.

As disclosed in FIG. 4, the testing device 3 may include the second processor 31, a second transmitting unit 32, a second storage 33, a comparing unit 34, and a second displaying unit 35, wherein the second transmitting unit 32, the second storage 33, the comparing unit 34, and the second displaying unit 35 are connected with the second processor 31. The second storage 33 stores a simulation software 331 for performing the second image processing procedure, and a second algorithm 332 used in the second image processing procedure. It should be mentioned that the second algorithm 332 may be directly recorded in the simulation software 331 through computer readable program codes, but not limited.

In the embodiment, the testing device 3 is connected with the image processing device 2 through the second transmitting unit 32, so as to receive the original image 241, the parameter setting value 242, and the hardware-processed image transmitted from the image processing device 2.

The testing device 3 executes the simulation software 331 stored in the second storage 33 through the second processor 31. As discussed above, after being executed, the simulation software 331 may perform the second image processing procedure to the original image 241 in accordance with the received parameter setting value 242, so as to generate the software-processed image. Also, the testing device 3 may directly compare the hardware-processed image provided by the image processing device 2 with the software-processed image generated by the simulation software 331 through the comparing unit 34, and generate a comparing result used to indicate the pixel difference between the hardware-processed image and the software-processed image.

In one of the exemplary embodiments, the comparing unit 34 may be a physical unit, such as a MCU or a processor. In another embodiment, the comparing unit 34 may be a software unit being implemented by the second processor 31 after the second processor 31 executes the testing software 123 as shown in FIG. 1, but not limited thereto.

After the comparing unit 34 finishes the comparing and generates the comparing result, the testing device 3 may display the comparing result through the second displaying unit 35, so the user may be awarded with the pixel difference between the hardware-processed image and the software-processed image. Therefore, the user may determine whether to adjust any of the first algorithm 251, the second algorithm 332, and the parameter setting value 242 or not based on the comparing result.

As disclosed above, the first algorithm 251 executed by the image processing hardware 25 is identical to the second algorithm 332 executed by the simulation software 331, and both the first algorithm 251 and the second algorithm 332 use the same parameter setting value 242 to process the same original image 241. If the comparing result shows that the pixel difference between the hardware-processed image and the software-processed image is greater than a tolerance threshold, it means either the first algorithm 251/the second algorithm 332 or the parameter setting value 242 has a problem. Accordingly, the user may adjust the first algorithm 251/the second algorithm 332 or the parameter setting value 242, so as to ensure that the designed IC may satisfy the user's demand. In the above embodiment, the designed IC means an image processing hardware 25 carrying with a correct algorithm and a correct parameter setting value.

In the embodiment of FIG. 4 and FIG. 5, the image processing device 2 and the testing device 3 are individually existed; therefore, the image processing device 2 may provide the original image 241, the parameter setting value 242, and the hardware-processed image to the testing device 3 through different manners. Different embodiments with different drawings are provided in the following for further interpretation.

Figure 6:
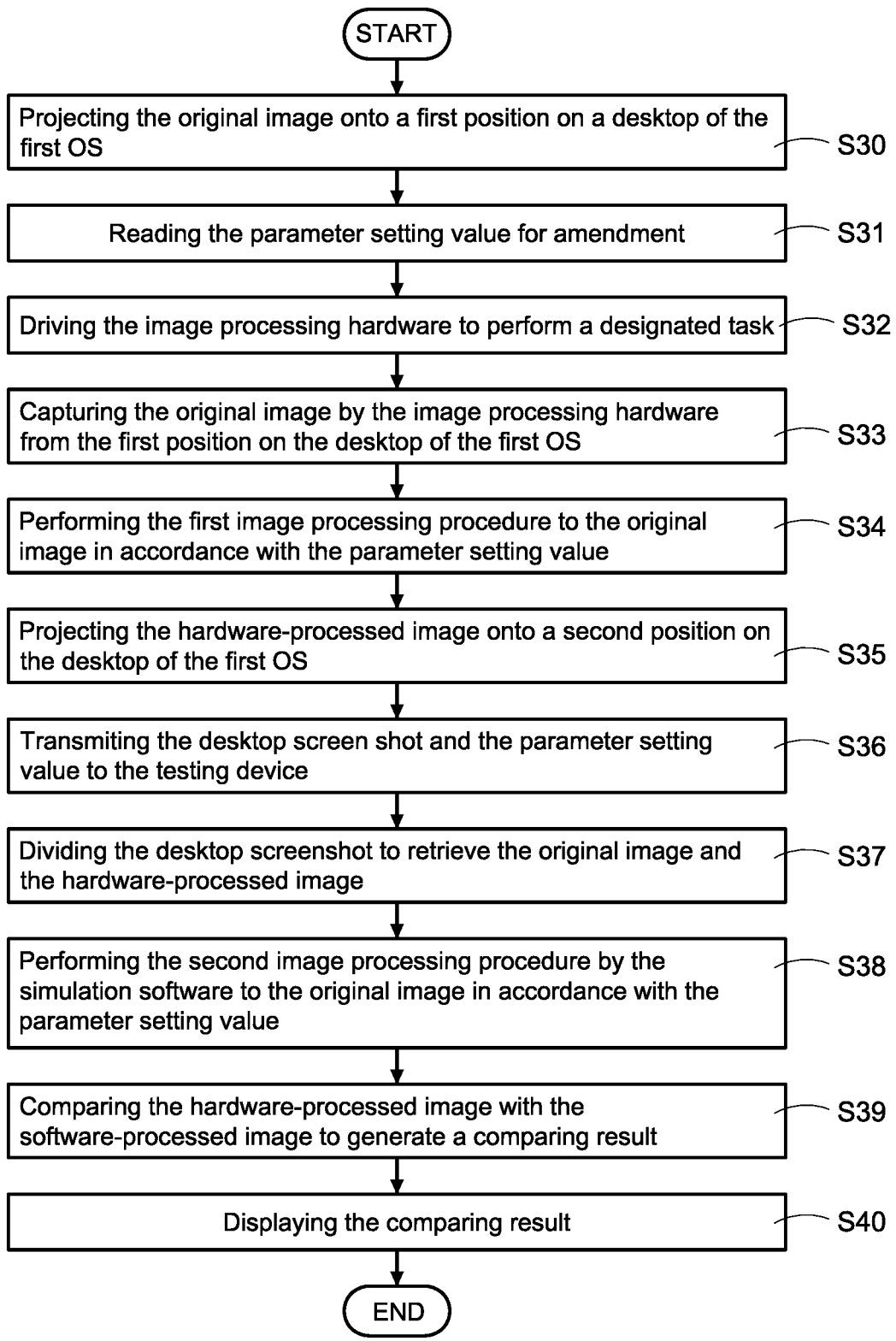
FIG. 6 is a flowchart of the testing method of a second embodiment according to the present disclosure.

Please refer to FIG. 4 and FIG. 6 at the same time, wherein FIG. 6 is a flowchart of the testing method of a second embodiment according to the present disclosure. In the embodiment of FIG. 6, the image processing device 2 first obtains the original image 241 and the parameter setting value 242, and stores the original image 241 and the parameter setting value 242 in the first storage 24 (such as a memory). Also, the image processing device 2 projects, through the control unit 10 such as the first processor 21, the original image 241 onto a first position on a desktop of the first OS (such as Linux) ran by the image processing device 2 (step S30). Next, the control unit 10 activates an engineering mode of the first OS, and reads the parameter setting value 242 from the first storage 24 for further amendment if needed (step S31). Also, the control unit 10 drives the image processing hardware 25 to perform a designated task through an instruction (step S32).

In one of the exemplary embodiments, in the step S30, the image processing device 2 accepts an external operation through the human-machine interface 22 to import the original image 241, or senses an external environment through the sensing unit 23 to generate the original image 241 in real-time, not limited thereto.

After the step S32, the image processing hardware 25 captures the original image 241 from the first position on the desktop of the first OS based on an instruction (step S33), and performs the first image processing procedure (such as executing the first algorithm 251) to the captured original image 241 in accordance with the parameter setting value 242 (step S34), so as to generate the hardware-processed image.

After the step S34, the image processing hardware 25 transmits the hardware-processed image to the first processor 21 of the image processing device 2, and the first processor 21 projects the hardware-processed image onto a second position on the desktop of the first OS (step S35), wherein the first position and the second position are not overlapped.

After the step S35, the first processor 21 captures a desktop screenshot of the entire desktop of the first OS, and transmits the desktop screen shot and the parameter setting value 242 used in the first image processing procedure to the testing device 3 through the first transmitting unit 26 (step S36).

Figure 8:
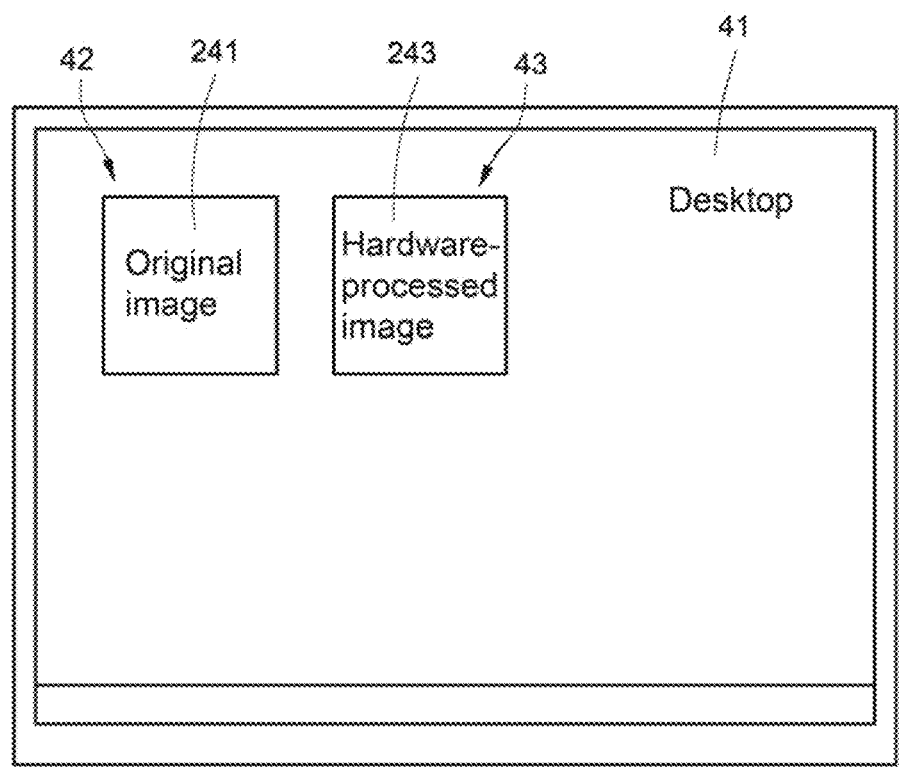
FIG. 8 is a schematic diagram of a screenshot of a first embodiment according to the present disclosure.

Please refer to FIG. 8 at the same time, FIG. 8 is a schematic diagram of a desktop screenshot of a first embodiment according to the present disclosure. As shown in FIG. 8, when the image processing device 2 runs the first OS, a desktop 41 of the first OS is generated correspondingly and displayed on the first displaying unit 27. After the image processing device 2 obtains the original image 241 through the human-machine interface 22 or the sensing unit 23, the first processor 21 projects the original image 241 onto a first position 42 on the desktop 41. After the image processing hardware 25 generates a hardware-processed image 243 through the first image processing procedure, the first processor 21 projects the hardware-processed image 243 onto a second position 43 on the desktop 41.

As shown in FIG. 8, the desktop 41 of the first OS includes the original image 241 and the hardware-processed image 243 at the same time, wherein the original image 241 and the hardware-processed image 243 are not overlapped with each other. Therefore, once the image processing device 2 transmits the desktop screenshot of the entire desktop 41 to the testing device 3, the testing device 3 may divide the received desktop screenshot of the desktop 41 to respectively obtain the original image 241 and the hardware-processed image 243.

Refer back to FIG. 6. After the step S36, the testing device 3 receives, through the second transmitting unit 32, the desktop screenshot of the desktop 41 and the parameter setting value 242 transmitted from the image processing device 22, and divides the desktop screenshot through the second processor 31 to retrieve the original image 241 and the hardware-processed image 243 (step S37).

Next, the testing device 3 executes the simulation software 331. The simulation software 331 performs the second image processing procedure (such as executing the second algorithm 332) to the original image 241 in accordance with the parameter setting value 243 (step S38), so as to generate the software-processed image. Also, the testing device 3 executes the testing software 123 (such as the comparing unit 34) as shown in FIG. 1; therefore, the testing software 123 compares the hardware-processed image 243 with the software-processed image to generate a comparing result (step S39). Finally, the testing device 3 may display the comparing result through the second displaying unit 35 (step S40).

In the embodiment of FIG. 6, the image processing device 2 projects both the original image 241 and the hardware-processed image 243 onto the desktop 41 for the user to check and confirm with ease. If the comparing result shows that the pixel difference between the hardware-processed image 243 and the software-processed image is greater than a tolerance threshold, the user may determine whether the first algorithm 251, the second algorithm 332, the original image 241, or the parameter setting value 242 has a problem by referencing the desktop screenshot of desktop 41.

Figure 7:
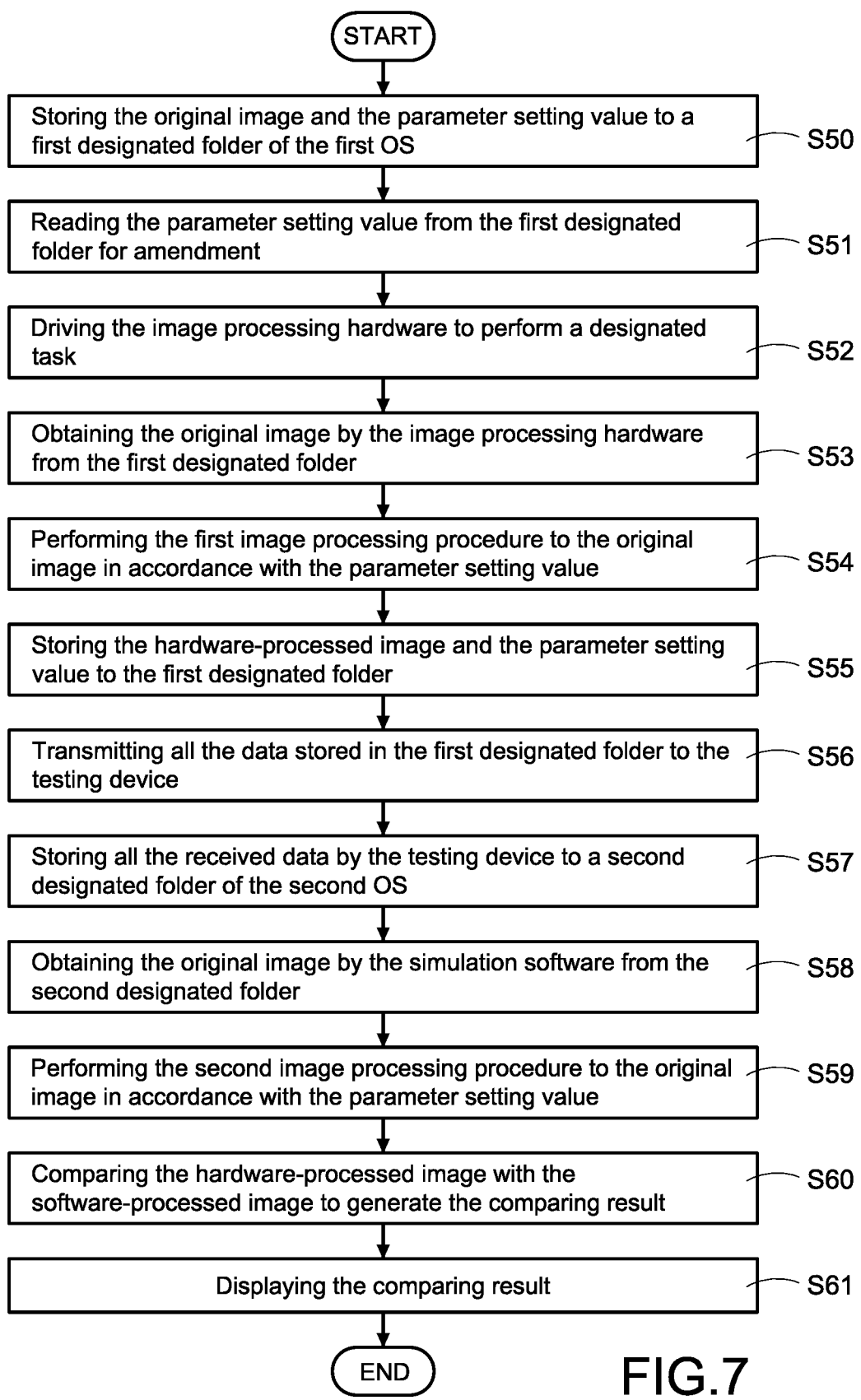
FIG. 7 is a flowchart of the testing method of a third embodiment according to the present disclosure.

Please refer to FIG. 4 and FIG. 7 at the same time, wherein FIG. 7 is a flowchart of the testing method of a third embodiment according to the present disclosure. In the embodiment of FIG. 7, the image processing device 2 first obtains the original image 241 and the parameter setting value 242, and stores the obtained original image 241 and the obtained parameter setting value 242 to a first designated folder of the first OS (such as Linux) ran by the image processing device 2 (step S50). Next, the control unit 10 of the image processing device 2 activates an engineering mode of the first OS in order to read the parameter setting value 242 from the first designated folder for further amendment if needed (step S51), and the control unit 10 drives the image processing hardware 25 to perform a designated task through an instruction (step S52).

After the step S52, the image processing hardware 25 obtains the original image 241 from the first designated folder based on the instruction (step S53), and performs the first image processing procedure (such as executing the first algorithm 251) to the original image 241 in accordance with the parameter setting value 242 (step S54), so as to generate the hardware-processed image. After the step S54, the image processing hardware 25 directly stores the generated hardware-processed image and the used parameter setting value 242 (may have been amended) to the first designated folder (step S55). In particular, the hardware-processed image is stored to the first designated folder without covering the original image 241 in the first designated folder.

After the step S55, the first processor 21 of the image processing device 2 transmits, through the first transmitting unit 26, all the data stored in the first designated folder to the testing device 3 (step S56).

After the step S56, the testing device 3 receives, through the second transmitting unit 32, all the data transmitted from the image processing device 2, and stores the received data to a second designated folder of the second OS (such as Windows) ran by the testing device 3 (step S57). Next, the testing device 3 executes the simulation software 331 through the second processor 31. The simulation software 331 obtains the original image 241 from the second designated folder (step S58), and performs the second image processing procedure (such as executing the second algorithm 332) to the original image 241 in accordance with the parameter setting value 243 (step S59), so as to generate the software-processed image.

After the step S59, the testing device 3 executes, through the second processor 31, the testing software 123 as shown in FIG. 1 (i.e., to trigger the comparing unit 34), and the testing software 123 compares the hardware-processed image 243 with the software-processed image and generates the comparing result (step S60). Finally, the testing device 3 may display the comparing result through the second displaying unit 35 (step S61). In the embodiment, the testing device 3 may optionally store the generated software-processed image and the comparing result to the second designated folder to be a record.

In the embodiment of FIG. 7, the image processing device 2 stores both the original image 241 and the hardware-processed image 243 to the first designated folder of the first OS, and the testing device 3 stores the original image 241, the hardware-processed image 243, the software-processed image, and the comparing result to the second designated folder of the second OS, so the user may easily check, record and confirm these information. If the comparing result shows that the pixel difference between the hardware-processed image 243 and the software-processed image is greater than a tolerance threshold, the user may determine whether the first algorithm 251, the second algorithm 332, the original image 241, or the parameter setting vale 242 has a problem based on the contents recorded in either the first designated folder or the second designated folder.

According to the above embodiment, the testing system 1 may first drive the image processing hardware 25 through the image processing device 11 to process the original image 241 in order to generate the hardware-processed image 243, and may execute the simulation software 331 through the testing device 3 to process the original image 241 in order to generate the software-processed image, and then compare the hardware-processed image 243 with the software-processed image through the testing device 3. However, in another embodiment, the comparing mentioned above may be implemented by the image processing device 11 as well.

More specific, in another embodiment, the original image 241 and the parameter setting value 242 may be obtained by the testing device 3 and stored to a designated folder of the second OS (such as Windows) ran by the testing device 3. Next, the testing device 3 may execute the simulation software 331 through the second processor 31. The simulation software 331 reads the original image 241 and the parameter setting value 242 from the designated folder, and performs the image processing procedure to the original image 241 in accordance with the parameter setting value 242 in order to generate the software-processed image. Also, the simulation software 331 stores the generated software-processed image to the designated folder.

In the embodiment, next, the testing device 3 transmits all the data in the designated folder to the image processing device 2, and the image processing device 2 stores the received data in another designated folder of the first OS (such as Linux) ran by the image processing device 2. The image processing device 2 activates the engineering mode through the first processor 21 to read the parameter setting value 242 and to drive the image processing hardware 25. The image processing hardware 25 then obtains the original image 241 from the designated folder of the first OA in accordance with an instruction, and performs the image processing procedure to the original image 241 in accordance with the parameter setting value 242 in order to generate the hardware-processed image 243.

In the embodiment, the image processing hardware 25 may be driven by the first processor 21 to obtain, from the designated folder of the first OS, the software-processed image transmitted from the testing device 3, and to compare the hardware-processed image 243 with the software-processed image and generate the comparing result.

The testing method of the present disclosure may compare the hardware-processed image 243 with the software-processed image either by the image processing device 2 or by the testing device 3, so as to automatically identify the image difference between the two images respectively generated by the image processing hardware 25 and the simulation software 331 after they respectively perform the same algorithm to the same image.

As mentioned above, one purpose of the present disclosure is to automatically identify the different between the image processing hardware 25 and the simulation software 331 after they respectively execute the same algorithm. Therefore, it may assist the user to determine whether the algorithm has a problem or the parameter used by the algorithm has a problem.

It should be mentioned that a complete image processing procedure usually includes multiple algorithms whose execution are scheduled in a sequential order. In one of the exemplary embodiments, the testing system 1 may render every algorithm in the image processing procedure to be executed respectively by both the image processing hardware 25 and the simulation software 331. The testing system 1 creates a testing point (TP) whenever one of the multiple algorithms is executed completely, and compares the hardware-processed image 243 generated by the image processing hardware 25 with the software-processed image generated by the simulation software 331 at every testing point. Therefore, once the comparing result shows that at least one pixel difference that is greater than the tolerance threshold exists between the hardware-processed image 243 and the software-processed image at one TP, the user may adjust the algorithm being used or the parameter setting value 242 being used before this TP, so as to optimize the final version of the image processing hardware 25 (i.e., the designed IC).

Figure 9A:
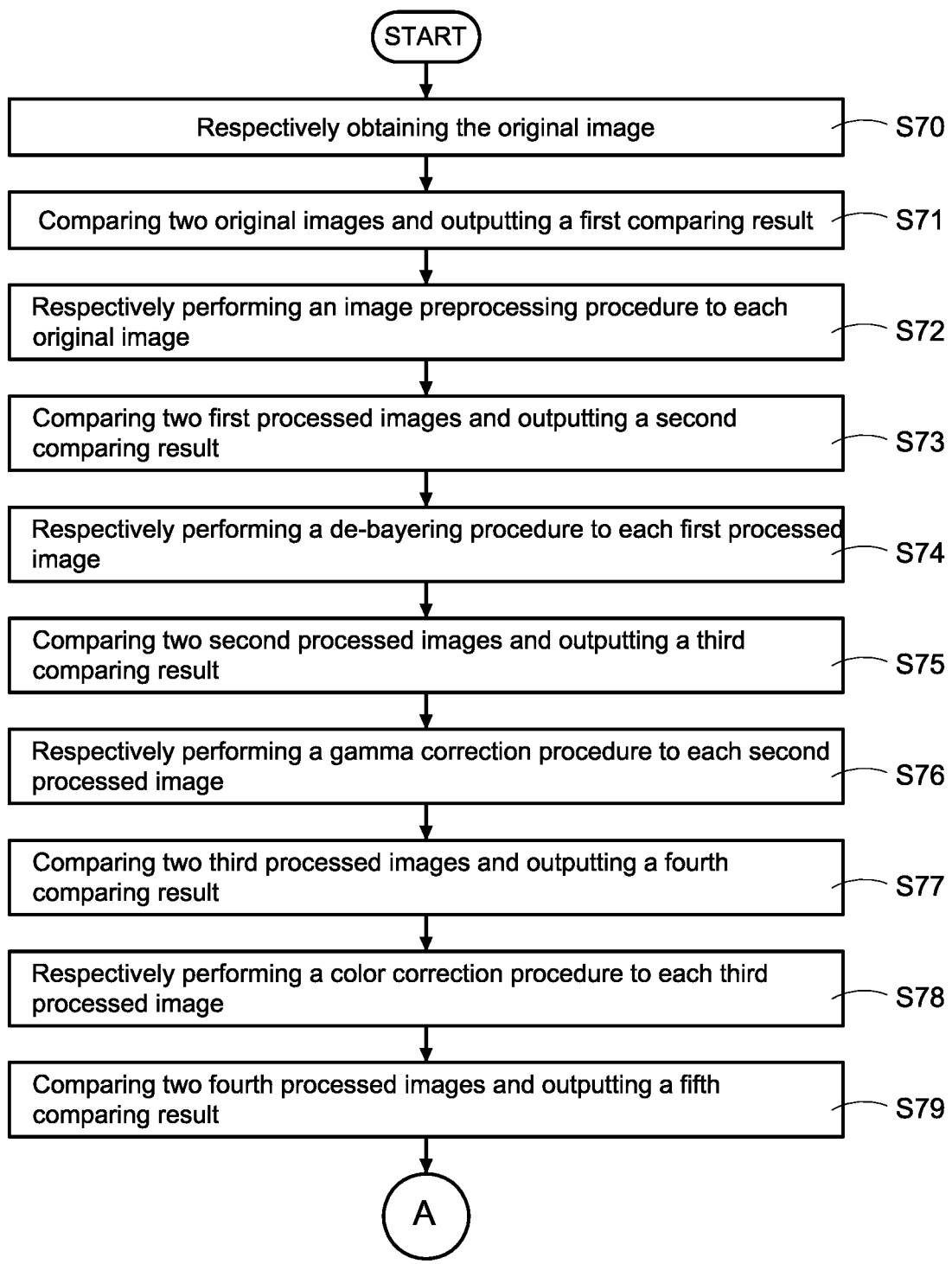
FIG. 9a is a flowchart of a first image processing of a first embodiment according to the present disclosure.
Figure 9B:
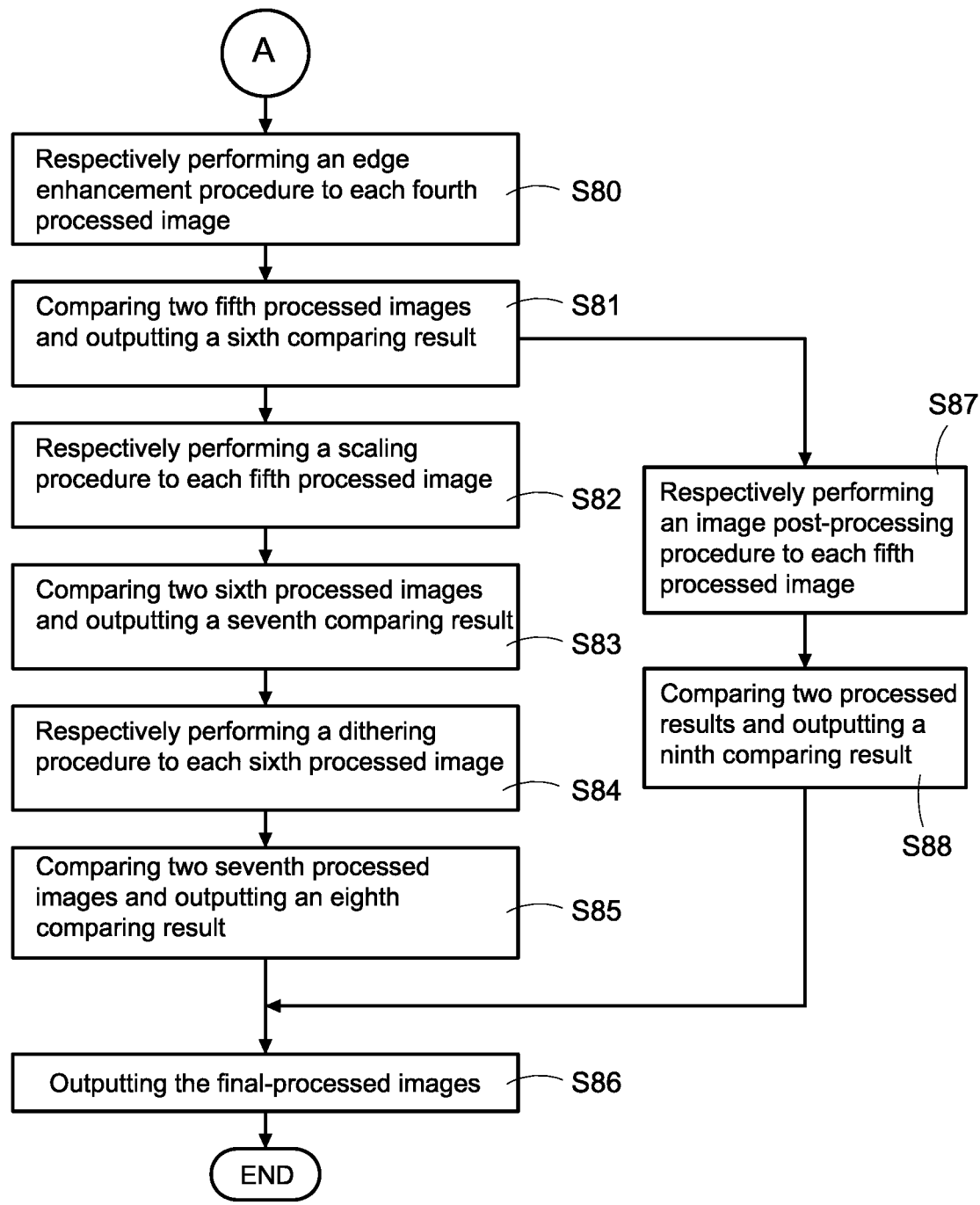
FIG. 9b is a flowchart of a second image processing of a first embodiment according to the present disclosure.

Please refer to FIG. 4, FIG. 9a, and FIG. 9b at the same time, wherein FIG. 9a is a flowchart of a first image processing of a first embodiment according to the present disclosure, FIG. 9b is a flowchart of a second image processing of a first embodiment according to the present disclosure. In the embodiment of FIG. 9a and FIG. 9b, the testing system 1 first controls both the image processing hardware 25 and the simulation software 331 to obtain the original image 241 respectively (step S70), and compares the two original images 241 respectively obtained by the image processing hardware 25 and the simulation software 331 and outputs a first comparing result (step S71). According to the first comparing result, the user may determine whether the original image 241 obtained by the image processing hardware 25 is identical to another original image 241 obtained by the simulation software 331.

Next, the testing system 1 controls the image processing hardware 25 and the simulation software 331 to respectively perform an image preprocessing procedure to the original image 241 based on same algorithm and same parameter setting value 242 (step S72), and compares two first processed images respectively generated by the image processing hardware 25 and the simulation software 331 and outputs a second comparing result (step S73). According to the second comparing result, the user may determine whether the algorithm and the parameter setting value 242 used by the image processing hardware 25 and the simulation software 331 in the image preprocessing procedure has a problem or not.

In particular, if the testing system 1 obtains the original image 241 through the sensing unit 23 of the image processing device 2, the sensed image (i.e., the original image 241) may be affected by external interference (such as noise) or internal interference (such as the optical or physical characteristics of the lens). The interference may affect the determination with respect to the original image 241 in the subsequent procedures; therefore, the image preprocessing procedure may be performed to process the interference.

Next, the testing system 1 controls the image processing hardware 25 and the simulation software 331 to respectively perform a de-bayering procedure to each first processed image based on same algorithm and same parameter setting value 242 (step S74), and compares two second processed images respectively generated by the image processing hardware 25 and the simulation software 331 and outputs a third comparing result (step S75). According to the third comparing result, the user may determine whether the algorithm and the parameter setting value 242 used by the image processing hardware 25 and the simulation software 331 in the de-bayering procedure has a problem or not.

In particular, a common-used image sensing unit may be a bayer sensor. If the testing system 1 obtains the original image 241 through the bayer sensor, it may transform the processed images into the field of R(red), G(green), and B(blue) through the de-bayering procedure.

Next, the testing system 1 controls the image processing hardware 25 and the simulation software 331 to respectively perform a gamma correction procedure to each second processed image based on same algorithm and same parameter setting value 242 (step S76), and compares two third processed images respectively generated by the image processing hardware 25 and the simulation software 331 and outputs a fourth comparing result (step S77). According to the fourth comparing result, the user may determine whether the algorithm and the parameter setting value 242 used by the image processing hardware 25 and the simulation software 331 in the gamma correction procedure has a problem or not.

In particular, the gamma correction procedure is performed to correct and adjust the color of the image within the field of RGB, and the color and the brightness of the adjusted image may be in line with human's eye vision.

Next, the testing system 1 controls the image processing hardware 25 and the simulation software 331 to respectively perform a color correction procedure to each third processed image based on same algorithm and same parameter setting value 242 (step S78), and compares two fourth processed images respectively generated by the image processing hardware 25 and the simulation software 331 and outputs a fifth comparing result (step S79). According to the fifth comparing result, the user may determine whether the algorithm and the parameter setting value 242 used by the image processing hardware 25 and the simulation software 331 in the color correction procedure has a problem or not.

In particular, everyone may feel different about the same image, after the gamma correction procedure, the testing system 1 may optionally perform the color correction procedure to the image, so as to fine-tune the colors of the image by gaining the three primary colors (i.e., red, green, and blue) respectively.

Next, the testing system 1 controls the image processing hardware 25 and the simulation software 331 to respectively perform an edge enhancement procedure to each fourth processed image based on same algorithm and same parameter setting value 242 (step S80), and compares two fifth processed images respectively generated by the image processing hardware 25 and the simulation software 331 and outputs a sixth comparing result (step S81). According to the sixth comparing result, the user may determine whether the algorithm and the parameter setting value 242 used by the image processing hardware 25 and the simulation software 331 in the edge enhancement procedure has a problem or not.

In particular, the edge enhancement procedure may be unnecessary. For example, images from the television only have to satisfy human's eye vision; therefore, the images may not have to be performed with the edge enhancement procedure. However, images being used in medical field need to provide more details (such as thinner blood vessels or tissues) for the doctor, so the images may be optionally performed with the edge enhancement procedure.

It should be mentioned that the edge enhancement procedure is usually performed to adjust the brightness of the images in advance, if the testing system 1 performs the gamma correction procedure after the edge enhancement procedure, the gamma correction procedure may reduce the effect of the edge enhancement procedure. Thus, in one embodiment, the edge enhancement procedure must be performed after the gamma correction procedure, but not limited.

After the step S81, the testing system 1 controls the image processing hardware 25 and the simulation software 331 to respectively perform a scaling procedure to each fifth processed image based on same algorithm and same parameter setting value 242 (step S82), and compares two sixth processed images respectively generated by the image processing hardware 25 and the simulation software 331 and outputs a seventh comparing result (step S83). According to the seventh comparing result, the user may determine whether the algorithm and the parameter setting value 242 used by the image processing hardware 25 and the simulation software 331 in the scaling procedure has a problem or not.

In particular, the purpose of performing the scaling procedure is to match the image with the size of a displayer (not shown), so the processed image may be completely displayed on the displayer.

Next, the testing system 1 controls the image processing hardware 25 and the simulation software 331 to respectively perform a dithering procedure to each sixth processed image based on same algorithm and same parameter setting value 242 (step S84), and compares two seventh processed images respectively generated by the image processing hardware 25 and the simulation software 331 and outputs an eighth comparing result (step S85). According to the eighth comparing result, the user may determine whether the algorithm and the parameter setting value 242 used by the image processing hardware 25 and the simulation software 331 in the dithering procedure has a problem or not.

In particular, the dithering procedure is performed to solve a quantization error produced when an image is transformed between high resolutions and low resolutions. The dithering procedure usually adds a random hash value (s) to the image, but the aforementioned scaling procedure usually applies an interpolation technique. If the scaling procedure is performed after the dithering procedure, the hash value added to the image in the dithering procedure may interfere the scaling effect of the scaling procedure. Thus, in one embodiment, the dithering procedure must be performed after the scaling procedure, but not limited.

After the step S85, the testing system 1 completes all of the algorithms for the image processing procedure, so the testing system 1 may output the final-processed images (including the hardware-processed image 243 and/or the software-processed image) through the image processing device 2 and the testing device 3 (step S86).

In one embodiment, the scaling procedure and the dithering procedure may not be performed. In this embodiment, the testing system 1 may control the image processing hardware 25 and the simulation software 331 to respectively perform an image post-processing procedure to the fifth processed image in accordance with same algorithm and same parameter setting value 242 after the edge enhancement procedure (step S87). Also, the testing system 1 compares two processed results (such as two processed images) respectively generated by the image processing hardware 25 and the simulation software 331 and output a ninth comparing result (step S88). According to the ninth comparing result, the user may determine whether the algorithm and the parameter setting value 242 used by the image processing hardware 25 and the simulation software 331 in the image post-processing procedure has a problem or not.

It should be mentioned that the image post-processing procedure may be performed, for example, through executing an AI recognition algorithm, for recognizing a region of interest (ROI) from the image. In particular, the image post-processing procedure may recognize an object of interest from the image in accordance with the parameter setting value 242 and mark the object (such as targeting this object by a square box), and specify a certain box size and coordinates (such as a starting point of the square box) for the object. In the step S88, the testing system 1 only compare a region of interest generated by the image processing hardware 25 with another region of interest generated by the simulation software 331, wherein the regions of interest here are values but images.

In particular, the image post-processing procedure usually use the object detecting technique, if the edge enhancement procedure is performed in advance (i.e., to enhance the image in advance), the mis-detecting rate for the object may be reduced. Thus, in one embodiment, the image post-processing procedure must be performed after the edge enhancement procedure, but not limited.

The description with respect to FIG. 9a and FIG. 9b is only one of the exemplary embodiments of the present disclosure. In one embodiment, the testing system 1 only controls the image processing hardware 25 and the simulation software 331 to sequentially perform the image preprocessing procedure, the de-bayering procedure, the gamma correction procedure, the color correction procedure, the scaling procedure, and the dithering procedure, and controls the testing software 123 (i.e., the comparing unit 34) to respectively compare the hardware-processed image 243 with the software-processed image after each of the procedures and generate the comparing result for each comparing correspondingly.

By sequentially performing the above procedures, the testing system 1 may finish the necessary tests for the algorithms and parameter setting values of the image processing procedure, so the user may easily correct and optimize the algorithm(s) and the parameter(s) of the image processing hardware 25 (i.e., the designed IC).

In the aforementioned embodiment, the testing system 1 controls the image processing hardware 25 and the simulation software 331 to perform same algorithm(s) in accordance with same parameter setting value(s) 242. However, in the embodiment that the image processing device 2 uses the sensing unit 23 to sense and generate the original image 241, the sensed and generated images may deviate from the user's expectation because most of the sensing units 23 are not ideal.

It is hard for the user to find an ideal sensing unit 23 without any deviation; therefore, the user has to do try and error for many times to amend the image processing hardware 25 (such as to fine-tune the parameters applied by the image processing hardware 25), so the images being formed (such as the original image 241 and the hardware-processed image 243) may be ideal or close to ideal. In order to do so, the present disclosure provides a real-time updating approach, which is interpreted below.

Figure 10:
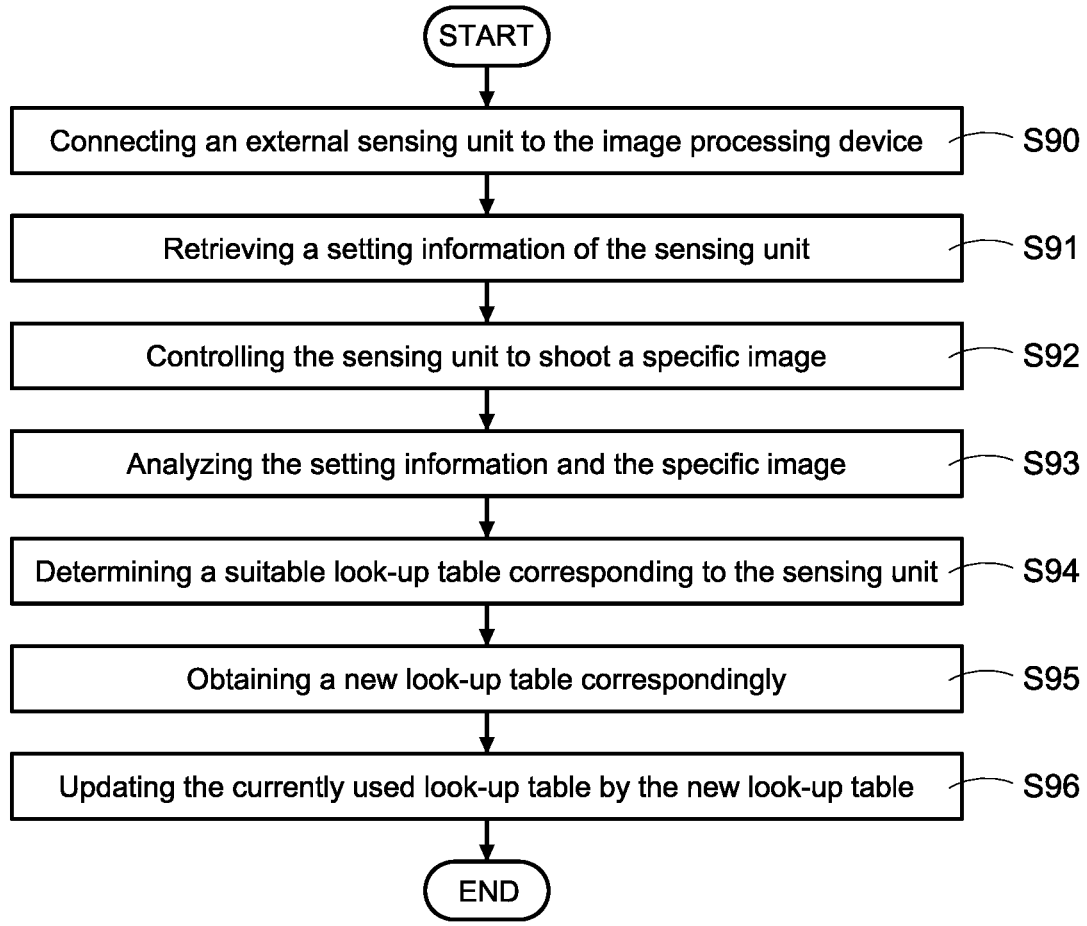
FIG. 10 is a flowchart of updating a look-up table of a first embodiment according to the present disclosure.

Please refer to FIG. 4 and FIG. 10 at the same time, wherein FIG. 10 is a flowchart of updating a look-up table of a first embodiment according to the present disclosure. As shown in FIG. 10, the user first connects an external sensing unit 23 (such as a camera, an infrared sensor, a laser sensor, or a medical endoscope, etc.) to the image processing device 2 (step S90). Next, the image processing device 2 retrieves a setting information of the sensing unit 23 by the first processor 21 (step S91), and controls the sensing unit 23 to shoot a specific image (step S92).

In one of the embodiments, the setting information may be a product type or product number of the sensing unit 23, a using count of the sensing unit 23, or a calibration record of the sensing unit 23, etc. The specific image may be a white image, a black image, a stripe image, or a current-sensed image, etc., but not limited thereto.

Next, the first processor 21 analyzes the setting information and the specific image (step S93), so as to determine a suitable look-up table that is corresponding to this sensing unit 23 (step S94). In one of the exemplary embodiments, the first processor 21 analyzes the setting information and the specific image through an internal analyzing unit, wherein the internal analyzing unit may be, for example but not limited to, the first processor 21 or a software unit generated when the testing software 123 shown in FIG. 1 is executed.

In other embodiment, the first processor 21 analyzes the setting information and the specific image through an external analyzing unit, wherein the external analyzing unit may be, for example but not limited to, an electronic device or a cloud server that is connected with the image processing device 2 through network. The look-up table is a look-up table that should be used by the image processing hardware 25 while the image processing hardware 25 executes a corresponding algorithm, and the look-up table records each parameter that is used by the sensing unit 23 while executing this algorithm.

After the step S94, the testing system 1 obtains a new look-up table correspondingly (step S95), and updates an old look-up table currently used by the new look-up table (step S96). In one embodiment, the testing system 1, in the step S95, may read a corresponding look-up table from the first storage 24 to use in accordance with the analyzing result of the step S94, or download a corresponding look-up table from an external electronic device or a cloud server, but not limited thereto.

Through the above updating approach, the user may ensure the quality of the image processing procedure without manually adjusting the image processing device 2 and the sensing unit 23. In particular, after the sensing unit 23 is connected to the image processing device 2, the image processing device 2 may automatically obtain a suitable look-up table based on the information of the sensing unit 23, such as the status of the lens, or the interference condition from outside, etc., and then updates the image processing device 2.

Taking a medical machine as the image processing device 2 as an example. When having an emergency medical service on an ambulance or in the operating room, the doctor may desire to obtain patient's physiological images immediately. By using the aforementioned updating approach, after the doctor connects the endoscope (i.e., the sensing unit 23) to the medical machine (i.e., the image processing device 2), the medical machine automatically performs a few seconds' determination and correction, and then obtains a preferred look-up table for this endoscope to execute each of the image processing algorithms. Therefore, the doctor doesn't have to waste his time to adjust the medical machine before using it.

For another example, when going outside for medical services (such as using a medical tour bus), the doctor may only bring one or two endoscopes. If the image quality of the endoscope is bad, but the doctor neither have a device for adjusting the endoscope, nor have a backup endoscope, the aforementioned updating approach may be used to assist the doctor to automatically update a suitable look-up table for these endoscopes, so as to maintain the quality of the images generated and formed by these endoscopes.

For another example, when the hospital performs a large-scaled medical test, the aforementioned updating approach may help the medical machines to automatically determine and update the suitable look-up table for each sensor that is used by the medical machines, so even a non-professional user may be able to operate the medical machines. Therefore, the hospital may not only quickly obtain proper and usable images, but also expand the number of qualified users who may operate the medical machines.

As discussed above, updating the look-up table in accordance with the information of the sensing unit 23 where the look-up table is used by the image processing hardware 25 while executing an image processing algorithm, may effectively improve the image quality. The look-up table is normally stored in the memory (such as the first storage 24) of the image processing device 2. However, in a standard update procedure, the device has to pause the current-executed image processing procedure before updating the look-up table stored in the memory, otherwise the device has to provide the memory with twice of its capacity for the update. Therefore, the updating approach is inconvenient in some application scenarios.

According to the above problem, the present disclosure further provides a novel updating approach, which may implement the update of the look-up table in real-time neither to pause the current-executed image processing procedure nor to use a memory with twice of its capacity.

Figure 11:
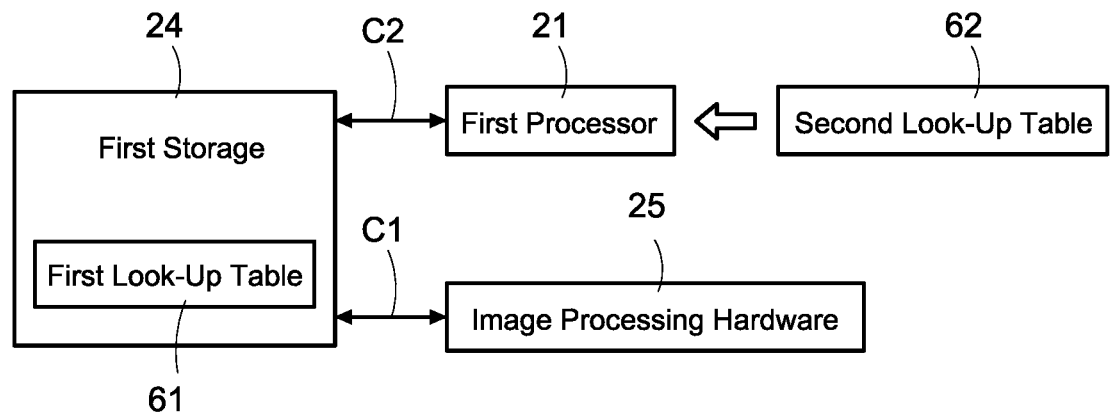
FIG. 11 is a schematic diagram of updating a look-up table of a first embodiment according to the present disclosure.

Please refer to FIG. 4 and FIG. 11 at the same time, wherein FIG. 11 is a schematic diagram of updating a look-up table of a first embodiment according to the present disclosure. As shown in FIG. 11, the first storage 24 of the image processing device 2 includes a first channel C1 and a second channel C2, wherein the first storage 24 connects to the image processing hardware 25 through the first channel C1 and connects to the first processor 21 through the second channel C2.

In the embodiment of FIG. 11, when executing an algorithm, the image processing hardware 25 may read a first look-up table 61 corresponding to the algorithm from the first storage 24 through the first channel C1.

After the first processor 21 analyzes the information of the current used sensing unit 23 and determines to update the first look-up table 61, the first processor 21 obtains a second look-up table 62 according to the analyzed result, and transmits the second look-up table 62 to the first storage 24 through the second channel C2, wherein the second look-up table 62 may be generated by the first processor 21 in real-time, or be download from a cloud server. Therefore, the first storage 24 may update the first look-up table 61 originally stored therein based on the content of the second look-up table 62, and provide the updated first look-up table 61 to the image processing hardware 25 through the first channel C1 for the image processing hardware 25 to use in following procedures.

By using the first storage 24 with dual channels, the image processing device 2 may implement the update of the look-up table in real-time with neither to stop the current image processing procedure of the image processing hardware 25 nor to provide the memory with twice of its capacity.

As the skilled person will appreciate, various changes and modifications can be made to the described embodiment. It is intended to include all such variations, modifications and equivalents which fall within the scope of the present disclosure, as defined in the accompanying claims.

What is claimed is:

1. A testing system for an image processing algorithm, comprising:
   a control unit, configured to provide an original image and a parameter setting value;
   an image processing device, connected with the control unit and configured to obtain the original image and the parameter setting value; an image processing hardware, connected with the image processing device, and configured to be driven by the image processing device to perform a first image processing procedure to the original image in accordance with the parameter setting value and generate a hardware-processed image; and
   a testing device, connected with the control unit and the image processing hardware, configured to obtain the hardware-processed image from the image processing hardware, and to obtain the original image and the parameter setting value from the control unit or the image processing hardware;
   wherein, the testing device is configured to execute a simulation software and a testing software, the simulation software is executed to perform a second image processing procedure to the original image in accordance with the parameter setting value and generate a software-processed image, the testing software is executed to perform a comparing procedure to compare the hardware-processed image with the software-processed image and generate a comparing result, wherein the second image procedure is identical to the first image procedure, and the comparing result shows a pixel difference between the hardware-processed image and the software-processed image,
   wherein the first image procedure and the second image procedure comprise a plurality of algorithms whose execution are scheduled in a sequential order, wherein the testing system creates a testing point (TP) whenever one of the plurality of algorithms is executed completely, and generates and compares the hardware-processed image with the software-processed image at every testing point,
   wherein the plurality of algorithms comprise de-bayering procedures, gamma correction procedures, scaling procedures, or dithering procedures;
   wherein, when the testing system determines that at least one of the pixel differences that is greater than a tolerance threshold exists between the hardware- processed image and the software-processed image at a certain one of the testing points, the testing system adjusts the algorithm being used or the parameter setting value being used before the certain one of the testing points.

2. The testing system in claim 1, wherein the image processing hardware is a field programmable gate array (FPGA), an application specific integrated circuit (ASIC), or a graphics processing unit (GPU).

3. The testing system in claim 1, wherein the image processing device runs a first operation system (OS) and the testing device runs a second OS, wherein the first OS is different from the second OS.

4. The testing system in claim 3, wherein the first OS is Linux, and the second OS is Windows.

5. The testing system in claim 3, wherein the testing device is a cloud server, and the cloud server is connected with the control unit and the image processing device wirelessly through network.

6. The testing system in claim 3, wherein the image processing device comprises a first transmitting unit, the testing device comprises a second transmitting unit, the image processing hardware is configured to transmit the hardware-processed image to the testing device through the first transmitting unit, and the testing device is configured to receive the hardware- processed image through the second transmitting unit.

7. The testing system in claim 6, wherein the control unit is configured to project the original image onto a first position on a desktop of the first OS, and the image processing hardware is driven to capture the original image from the first position, wherein the image processing device comprises a first processor, and the first processor is configured to project the hardware-processed image onto a second position not overlapped with the first position on the desktop, and to capture a desktop screenshot of the desktop and transmit the desktop screenshot and the parameter setting value to the testing device.

8. The testing system in claim 6, wherein the control unit is configured to store the original image and the parameter setting value to a designated folder of the first OS, and the image processing hardware is driven to read the original image from the designated folder and to store the hardware-processed image to the designated folder, wherein the image processing device comprises a first processor, and the first processor is configured to transmit all data stored in the designated folder to the testing device.

9. The testing system in claim 3, wherein the plurality of algorithms further comprise image preprocessing procedures, color correction procedures, edge enhancement procedures, or image post-processing procedures.

10. The testing system in claim 9, wherein the image processing hardware and the simulation software are configured to respectively perform the image preprocessing procedures, the de-bayering procedures, the gamma correction procedures, the color correction procedures, the scaling procedures, and the dithering procedures in a sequential order, and the testing software is configured to perform the comparing procedure to compare the hardware-processed image with the software-processed image respectively generated by each of the image preprocessing procedures, the de-bayering procedures, the gamma correction procedures, the color correction procedures, the scaling procedures, and the dithering procedures, and respectively generate the comparing result.

11. The testing system in claim 3, wherein the image processing device comprises:
a human-machine interface, configured to receive an external operation to import the original image and to set the parameter setting value; and
a sensing unit, configured to sense an external environment to generate the original image.

12. A testing method for an image processing algorithm, incorporated with a testing system comprising an image processing device for controlling a first image processing procedure and a testing device for controlling a second image
a) obtaining an original image and a parameter setting value;
b) driving an image processing hardware by the image processing device for the image processing hardware to perform the first image processing procedure to the original image in accordance with the parameter setting value and to generate a hardware-processed image;
c) obtaining the hardware-processed image from the image processing hardware by the testing device
d) executing a simulation software by the testing device, wherein the simulation software is executed to perform the second image processing procedure to the original image in accordance with the parameter setting value and to generate a software-processed image, wherein the second image processing procedure is identical to the first image processing procedure; and
e) executing a testing software by the testing device, wherein the testing software is executed to perform a comparing procedure to compare the hardware-processed image with the software-processed image to generate a comparing result, wherein the comparing result shows a pixel difference between the hardware-processed image and the software-processed image,
wherein the first image procedure and the second image procedure comprise a plurality of algorithms whose execution are scheduled in a sequential order, wherein the testing system creates a testing point (TP) whenever one of the plurality of algorithms is executed completely, and generates and compares the hardware-processed image with the software-processed image at every testing point,
wherein the plurality of algorithms comprise de-bayering procedures, gamma correction procedures, scaling procedures, or dithering procedures;
wherein, when the testing system determines that at least one of the pixel differences that is greater than a tolerance threshold exists between the hardware-processed image and the software-processed image at a certain one of the testing points, the testing system adjusts the algorithm being used or the parameter setting value being used before the certain one of the testing points.

13. The testing method in claim 12, wherein the image processing hardware is a field programmable gate array (FPGA), an application specific integrated circuit (ASIC), or a graphics processing unit (GPU), and the image processing device is configured to run a first operation system (OS), and the testing device is configured to run a second OS, wherein the first OS is different from the second OS.

14. The testing method in claim 13, wherein the step c) comprises transmitting the hardware-processed image to the testing device by the image processing device through a first transmitting unit, and receiving the hardware-processed image by the testing device through a second transmitting unit.

15. The testing method in claim 14, further comprising a step a1) after the step a):
projecting the original image onto a first position on a desktop of the first OS by the control unit;
wherein the step b) comprises driving the image processing hardware to capture the original image from the first position, and the testing method comprises following steps after the step b):
b1) transmitting the hardware-processed image by the image processing hardware to a first processor of the image processing device;
b2) projecting the hardware-processed image by the first processor onto a second position not overlapped with the first position on the desktop; and b3) capturing a desktop screenshot of the desktop and transmitting the desktop screenshot and the parameter setting value to the testing device by the first processor.

16. The testing method in claim 14, further comprising a step a1) after the step a):
   storing the original image and the parameter setting value to a designated folder of the first OS by the control unit; wherein the step b) comprises driving the image processing hardware to read the original image from the designated folder, and the testing method comprises following steps after the step b):
   b4) storing the hardware-processed image to the designated folder by the image processing hardware; and
   b5) transmitting all data stored in the designated folder to the testing device by a first processor of the image processing device.

17. The testing method in claim 14, wherein the plurality of algorithms further comprise image preprocessing procedures color correction procedures, edge enhancement procedures, or image post-processing procedures.

18. The testing method in claim 17, wherein the step b) and the step d) comprise performing the image preprocessing procedures, the de-bayering procedures, the gamma correction procedures, the color correction procedures, the scaling procedures, and the dithering procedures in a sequential order, and the step e) comprises performing the comparing procedure to compare the hardware-processed image with the software-processed image respectively generated by each of the image preprocessing procedures, the de-bayering procedures, the gamma correction procedures, the color correction procedures, the scaling procedures, and the dithering procedures, and generating the comparing result respectively.

19. The testing method in claim 13, wherein the step a) comprises accepting an external operation by a human-machine interface of the image processing device to import the original image, or sensing an external environment by a sensing unit of the image processing device to generate the original image.

* * * * *